April 28, 1964   E. W. KULESH ETAL   3,130,642
GEAR HOBBING MACHINES

Filed Oct. 6, 1960   3 Sheets-Sheet 1

INVENTORS
EUGENE W. KULESH
REGINALD S. LANIER
ROBERT J. HELGERUD
By Moore, White & Burd
ATTORNEYS April 28, 1964 E. W. KULESH ETAL 3,130,642
GEAR HOBBING MACHINES
Filed Oct. 6, 1960 3 Sheets-Sheet 3

INVENTORS
EUGENE W. KULESH
REGINALD S. LANIER
ROBERT J. HELGERUD
By Moore, White & Burd
ATTORNEYS

United States Patent Office 3,130,642
Patented Apr. 28, 1964

3,130,642
GEAR HOBBING MACHINES
Eugene W. Kulesh and Reginald S. Lanier, Wayzata, and Robert J. Helgerud, Hopkins, Minn., assignors to Washington Scientific Industries, Inc., Minneapolis, Minn., a corporation of Minnesota
Filed Oct. 6, 1960, Ser. No. 60,827
6 Claims. (Cl. 90—1.4)

This invention relates to new and useful improvements in gear hobbing machines and more particularly to a mechanism which may well be termed an attachment for such a machine which, when attached thereto, will effectively and completely remove burrs and the like from gears and pinions caused by the cutting tool or hob in the operation of cutting the gear teeth.

In the manufacture of gears it is well known that the cutting tool or hob usually leaves small burrs on the ends of the gear teeth as the cutting tool moves out of engagement with the gear. These burrs are objectionable and must be removed to provide a smoothly finished gear, particularly when making small gears designed for use in complex machinery. Various attempts have heretofore been made to provide means for deburring small cut gears, but to the best of our knowledge, none of them have proven entirely satisfactory in actual use.

It is therefore an important object of the present invention to provide a deburring mechanism which is so constructed that the deburring or grinding wheel maintains an adjustable light pressure against the face of the gear being deburred, as the hob is fed across the gear blank. During such movement of the hob, the deburring wheel maintains a light feather-like engagement with the side of the gear being deburred, thereby to assure that each gear or pinion will be completely and smoothly deburred.

Another important object of the invention is to provide an attachment for a gear cutting machine having means for readily and quickly attaching it to the machine, and having means for accurately positioning the cutting face of the abrading or grinding wheel with relation to the side face of the gear to be deburred, and whereby the abrading wheel is yieldably held against the gear face with a light controlled touch so that the abrading wheel cannot gouge or damage the gear during the deburring operation.

A further object of the invention is to provide a self-contained deburring mechanism having means for mounting it on the frame of a conventional gear cutting machine and comprising a rotatable deburring element mounted for swinging movement in a horizontal plane, and means being provided for constantly urging the deburring element into deburring engagement with the gear to be deburred with a uniformly light pressure, thereby to effect complete removal of the burrs from the gear, and with the assurance the deburring element cannot damage the gear.

A further object is to provide means in conjunction with a conventional gear cutting machine whereby the burrs occurring on the side face of a gear during the gear cutting operation may be removed simultaneously as the gear teeth are cut, whereby when the gear cutting operation is completed and the finished gear is removed from the machine, it will require no further deburring treatment.

Other objects of the invention reside in the unique manner in which the grinding wheel is supported with relation to the gear to be deburred, whereby the burrs resulting from the gear cutting tool may be completely and entirely removed from the gear with the assurance that the grinding wheel will not cut into the side face of the gear; in the universal mounting of the grinding wheel relative to the work or gear; in the pivotal mounting of the abrading wheel supporting arm which comprises opposed cone-shaped pivots having means for accurately adjusting them with respect to one another to eliminate play and to assure that the wheel will engage the work in a smooth positive manner; in the means for counterbalancing the weight of the grinding wheel whereby the supporting arm may pivot freely about its vertical axis with a minimum of resistance; in the means provided for gently urging the grinding wheel into cutting engagement with the side face of the gear wheel, whereby the abrading action may be accurately controlled to avoid any possible danger of the grinding wheel grouping and damaging the gear face; and in the provision of such a deburring attachment which is extremely simple and inexpensive in construction, and is positive and highly efficient in operation.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

In the drawings:

FIGURE 3 is a fragmentary view showing the gear cutting tool or hob about to complete the gear cutting operation.

Figure 1:
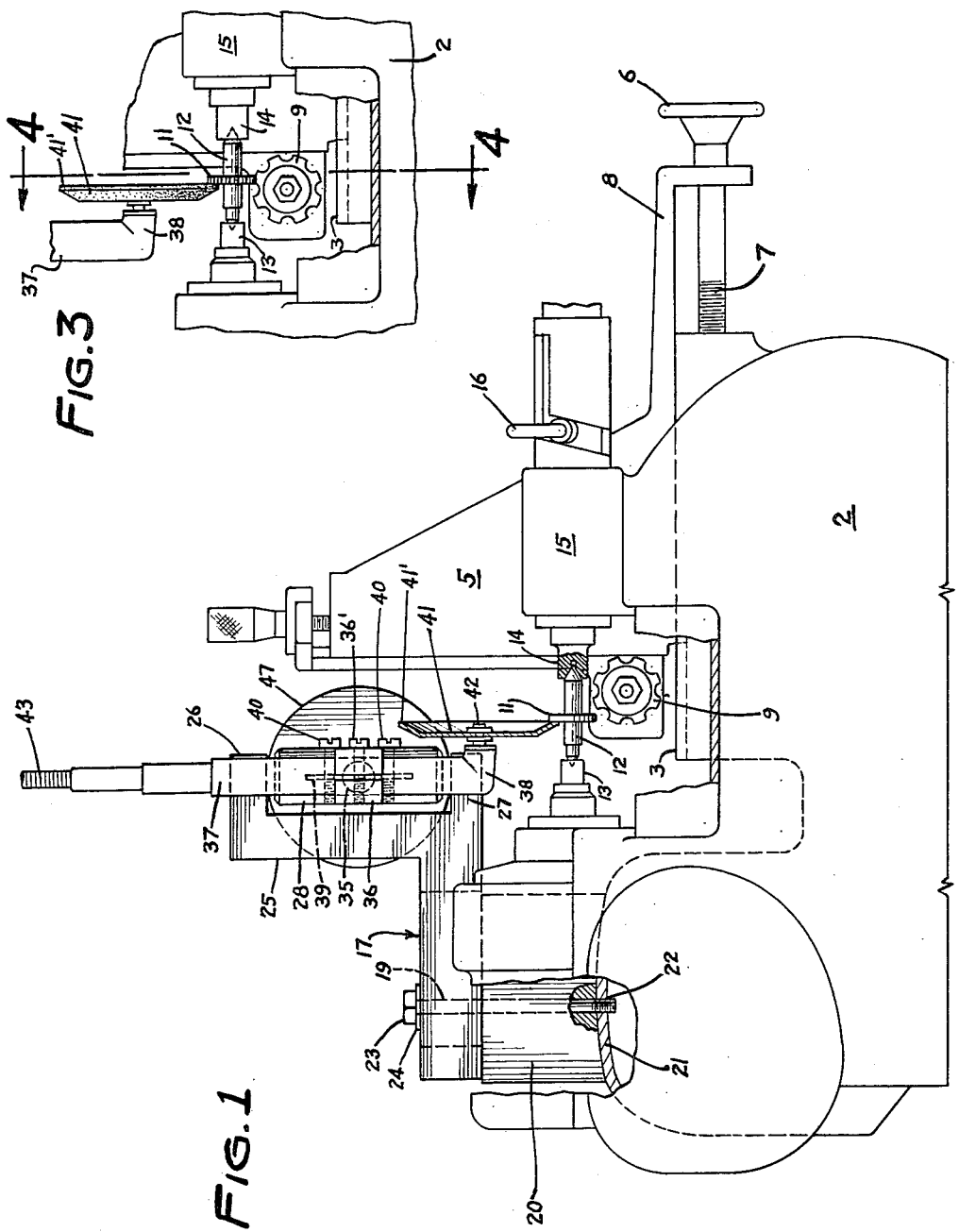
FIGURE 1 is a front elevation of a portion of a conventional gear cutting machine showing the invention mounted thereon with the deburring wheel engaged with a side face of the gear blank and the cutting tool or hob about to engage the blank.

In the selected embodiment of the invention here shown there is illustrated in the drawings, for purposes of disclosure, a portion of a conventional gear cutting machine comprising the usual frame 2, bed 3, having the usual V-shaped guideways 4—4 therein for slidably supporting the usual head 5 during the gear cutting operation, as is well known in the art.

The head 5 is movable in the guideways 4—4 by manipulation of a hand wheel 6 secured to one end of a feed screw 7 received in threaded engagement with the machine frame. The opposite end of feed screw 7 is rotatably supported in the outer end of an arm 8, forming a part of the head 5. Rotation of the hand wheel 6 in one direction, moves the hob or cutting tool, generally designated by the numeral 9, into cutting engagement with the gear blank 11, shown supported on a spindle 12, releasably supported between opposed spindles 13 and 14 of the gear cutting machine. Spindle 14 of the machine is axially movable in a guide 15 by manipulation of a lever 16, comprising a bayonet clamping device whereby the spindle 14 may be locked against axial movement, as is well known in the art.

Figure 2:
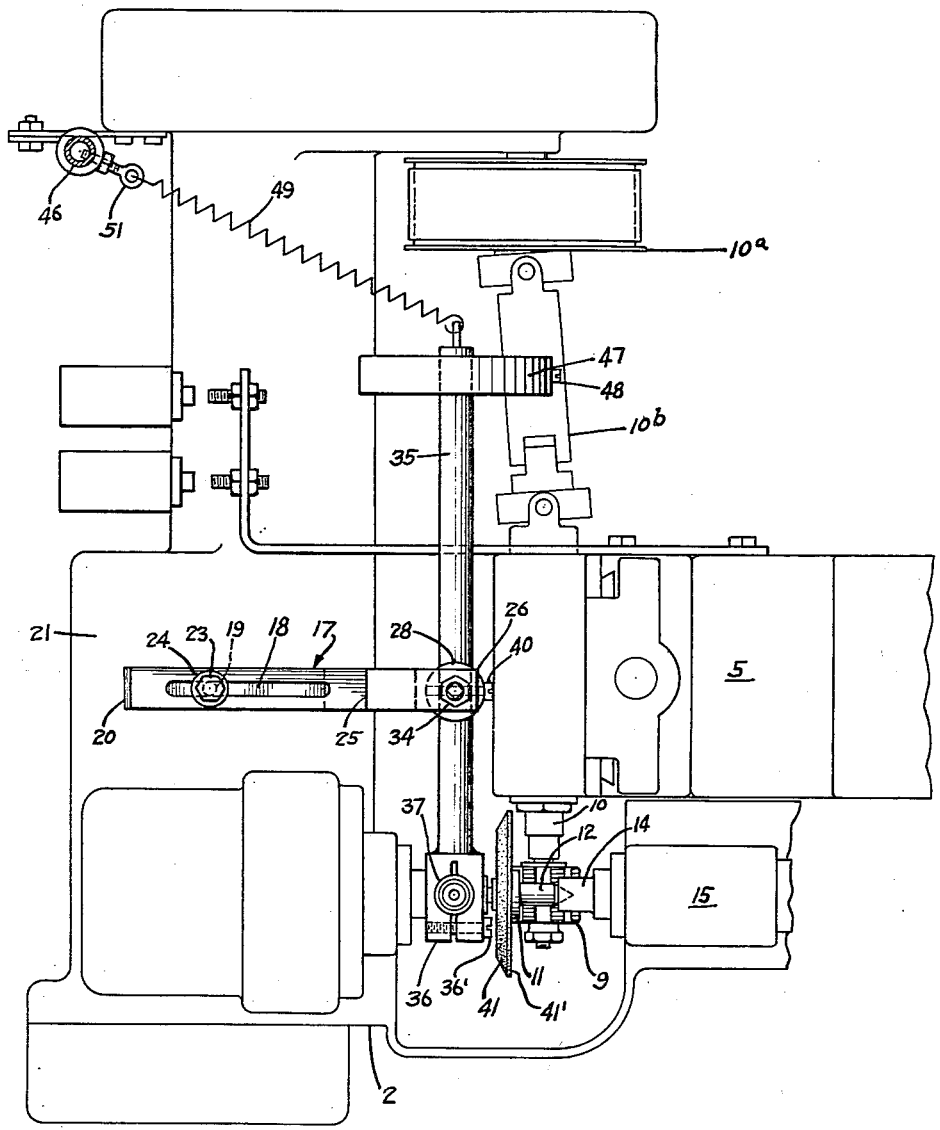
FIGURE 2 is a plan view of FIGURE 1 showing the means for adjustably securing the deburring attachment to the frame of the gear cutting machine, and also showing the means for gently urging the grinding wheel into deburring engagement with the gear.
Figure 4:
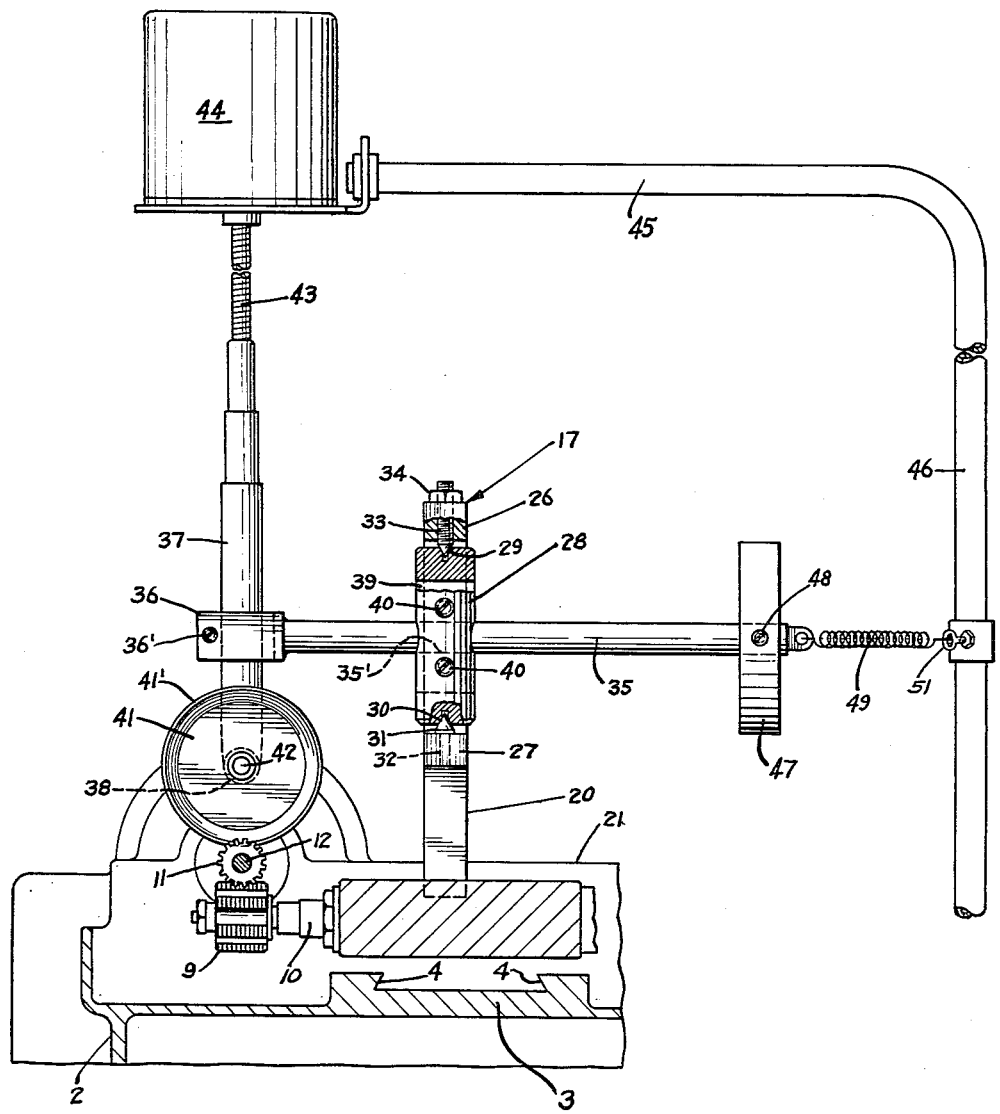
FIGURE 4 is a view substantially on the line 4—4 of FIGURE 3, with some of the parts omitted, showing the means provided for driving the grinding wheel, and also the pivotal mounting of the supporting arm and also the counterweight for counterbalancing the grinding wheel.

The hob 9 is detachably secured to the usual arbor 10 of the gear cutting machine, as indicated in FIGURE 4, and as is well known in the art. Arbor 10 is shown driven from a pulley 10a through the usual drive member 10b, as indicated in FIGURE 2.

Suitable means, not shown in the drawings, is provided for automatically translating the head 5 in its guideways 4—4 to feed the hob or cutting tool into engagement with the gear blank during the operation of cutting the gear teeth in the blank 11.

Other means not shown in the drawings are provided for automatically moving the hob out of engagement with the gear when it reaches the end of its cutting travel, indicated in FIGURE 4. The means provided for thus moving the hob out of cutting engagement with the gear blank at the end of the gear cutting movement, and also the means for controlling the operation of the hob during the cutting operation forms no part of the present invention and it is therefore believed unnecessary to herein show the same in detail.

In the operation of cutting gears with a hob, it is well known that small fins or burrs, as they are known in the trade, are left on the ends of the gear teeth from which the cutting elements of the hob emerge, upon completion of each gear cutting operation. In the operation of cutting small gears and pinions, these burrs are quite small, and extreme care must therefore be exercised in removing them from the gear to avoid damaging the face of the gear.

An important feature of the present invention therefore resides in the provision of a deburring mechanism capable of removing burrs from small gears, and the like, with the assurance that the gears will not be damaged by the action of the deburring wheel during each deburring operation.

The deburring mechanism herein disclosed is shown comprising a mounting bracket 17 having an elongated slot 18 therein for receiving a clamping screw or bolt 19, the lower end of which is received in threaded engagement with a portion 21 of the machine frame, as clearly indicated at 22 in FIGURE 1. Screw 19 has a head 23 at its upper end shown seated against a washer 24 which overlies the slot 18 in the mounting bracket 17, as shown in FIGURE 2. Bracket 17 is shown mounted on a spacing block or adaptor 20 having its lower surface fashioned to fit the contour of the portion 21 of the machine frame, as best shown in FIGURE 1. The upper surface of the spacing block 20 is machined to receive the bracket 17. Bolt 19 traverses an aperture in spacer 20 and secures said spacer and the bracket in fixed position on the machine frame, as will be understood.

Bracket 17 has an upstanding portion 25 shown provided with vertically spaced horizontal lugs 26 and 27 which cooperate to pivotally support therebetween a cylindrical member 28. Opposed axially aligned cone-shaped pivots 29 and 30 are mounted in the lugs 26 and 27, respectively. Pivot pin 30 is shown having an annular shoulder 31 seated on the upper face of lug 27, thereby to prevent downward movement of pivot pin 30. Pivot pin 30 has a cylindrical portion received in aperture 32 in lug 27, as best shown in FIGURE 4. Pivot pin 29 is vertically adjustable in lug 26 by means of threads 33 and a lock nut 34. The upper end of the threaded pivot pin 29 may be slotted to receive a screw driver or other instrumentality to facilitate rotating said pin to obtain the desired pivotal support for member 28.

Mounted for rotary and longitudinal adjustments in member 28 is an elongated horizontal member or bar 35 having an enlarged split head at one end bored to receive an upright tubular member 37, shown having an L-shaped lower end portion 38. See FIGURE 1. Member 28 has a transverse bore 35' intermediately of its ends adapted to receive member 35. To facilitate adjustment of member 35 in member 28, member 28 is axially slotted a substantial portion of its length, as indicated at 39 in FIGURE 1. Slot 39 extends diametrically through member 28, whereby its opposite walls may be contracted by manipulation of a pair of clamping screws 40, thereby to cause the walls of the bore 35 in member 28 to frictionally grip and secure member 35 in adjusted position in member 28, as will be understood by reference to FIGURES 1 and 4. The upright tubular member 37 is similarly secured in adjusted position in head 36 of member 35 by such means as a clamping screw 36'.

Rotatably supported at the lower end of the tubular member 37 is a burr-removing or grinding wheel, generally designated by the numeral 41, here shown as being dish-shaped in cross-section. The outer marginal edge portion 41' of the grinding wheel is preferably disposed in parallel relation to the adjacent side face of the gear 11 to be deburred, thereby to more effectively remove the burrs from the gear. The grinding wheel is detachably secured to a short stub shaft 42 having a driving connection with a flexible shaft 43 mounted within the tubular member 37, by such means as a pair of bevel gears, not shown, provided within the lower L-shaped end portion 38 of member 37.

Flexible shaft 43, as here shown, may be connected directly to a small electric motor 44, shown mounted on the horizontal end portion of a supporting member 45. Supporting member 45 has a depending upright portion 46 which may be secured to the machine frame or to some other fixed object, as will be understood by reference to FIGURE 4. The flexible shaft 43 is of such size and length as to provide adequate flexibility for free swinging movement of the grinding wheel during each deburring cycle.

To assure free swinging movement of the deburring wheel 41, means is provided for counterbalancing the weight of the grinding wheel 41 and member 37, whereby the grinding wheel may freely and effectively maintain its grinding engagement with the side face of the gear with the desired feather-like touch to assure complete removal of all burrs and other small irregularities in the work without any danger of damaging the work during the deburring operation.

To thus counterbalance the weight of the grinding wheel 41 and member 37, a counterweight 47 is adjustably secured to the horizontal rod 35 by such means as a set screw 48, whereby the counterweight may readily be moved axially on rod 35 to accurately balance the parts to assure free pivotal movement of member 28 on its pivots 29 and 30.

A light spring 49 is shown having one end secured to bar 35 and its opposite end may be adjustably secured to a fixed anchor 51, whereby the tension in spring 49 may be varied to obtain the desired pressure of the grinding wheel against the gear 11 being deburred.

In the foregoing it will be understood that we have provided a deburring mechanism which is substantially automatic in operation, once the grinding wheel has been moved into deburring contact with the gear wheel. The spring 49 constantly urges the grinding wheel into grinding engagement with the side face of the gear wheel with a very light or delicate touch, whereby the grinding wheel quickly and completely removes the burrs from the side face of the gear with the assurance that it cannot cause damage to the gear during the deburring operation. The annular flat edge portion 41' of the grinding wheel is so adjusted relative to the side face of the gear being deburred as to be substantially parallel thereto to effect maximum deburring efficiency.

The operating mechanism for the hob or cutting tool 9 is so designed that when the hob completes its forward deburring operation, as shown in FIGURE 3, its operating mechanism is automatically actuated to cause the hob to drop to a lower level out of engagement with the gear, after which the clamping lever 16 may be operated to release the gear from its supporting spindles 13 and 14. The hob is then retracted to the position shown in FIGURE 1, after which another gear or pinion may be inserted between spindle 13 and 14, and the cycle repeated.

A feature of the invention resides in the unique manner in which the grinding wheel is mounted whereby it engages the gear face with a very light or feather-like touch, with just enough pressure to remove the fine burrs produced by the gear cutting tool or hob. Thus, the grinding wheel, under normal operating conditions cannot gouge or otherwise damage the gear face or work during each deburring operation.

The deburring mechanism, as best illustrated in FIGURE 4, may be constructed as a complete unit independently of the gear milling machine, whereby it may readily and quickly be attached to a milling machine without the use of special tools, as will be understood by reference to FIGURES 2 and 4.

The mechanism has been found extremely practical and efficient in actual use, particularly for deburring small gears and pinions on which the burrs may be very minute in size, and thus require a very light touch of the grinding wheel for their complete removal. Obviously, the device may, if desired, be designed for deburring relatively larger gears and pinions without departing from the scope of the invention. It is also to be understood that the invention is not to be limited to the specific form of drive motor shown in FIGURE 2, as obviously other means may be substituted for driving the grinding wheel 41, provided it permits the grinding wheel to maintain its floating contact with the gear face, as will be understood.

It is apparent that many modifications and variations of the invention as hereinbefore set forth may be made without departing from the spirit and scope thereof. The specific embodiments described are given by way of example only and the invention is limited only by the terms of the appended claims.

We claim as our invention:

1. A deburring attachment for a gear cutting machine, including a supporting frame, an arbor rotatably mounted in said frame and having a hob secured thereto, and means for supporting a gear blank in cutting relation to the hob, said attachment comprising a supporting bracket having means for adjustably securing it to the machine frame, an elongated horizontal bar pivoted to said bracket and swingable in a horizontal plane, a member adjustably mounted in one end of said elongated bar, a shaft rotatably supported in said member, a deburring wheel operatively connected to said shaft and disposed in deburring relation to the gear to be deburred, means for driving said shaft, and means connected to the opposite end of said elongated bar for constantly urging the deburring wheel into deburring engagement with the gear being cut, thereby to remove burrs from the gear teeth during the gear cutting operation.

2. A deburring attachment according to claim 1, wherein the elongated bar is mounted for pivotal movement between vertically spaced cone-shaped pivots, thereby to minimize play and assure accurate engagement of the deburring wheel with the gear.

3. A deburring attachment according to claim 2, wherein the horizontal bar is slidably mounted in an upright supporting member having axially aligned cone-shaped recesses in its opposed ends for receiving said cone-shaped pivots.

4. A deburring attachment for a gear cutting machine, including a supporting frame, an arbor rotatably mounted in said frame and having means at one end for detachably supporting a hob, and means for supporting a gear blank in cutting relation to the hob, said attachment comprising a supporting bracket having means for adjustably securing it to the machine frame, an upright member pivoted in said bracket for swinging movement about a vertical axis, a horizontal bar mounted in said upright member and adapted for rotary and axial adjustments therein, a horizontal shaft rotatably supported by said bar at one end thereof, a deburring wheel secured to said shaft in deburring relation to the adjacent side face of the gear to be deburred, and means for driving said shaft.

5. A deburring attachment for a gear cutting machine, including a supporting frame, an arbor rotatably mounted in said frame and having means at one end for detachably supporting a hob, and means for supporting a gear blank in cutting relation to the hob, said attachment comprising a supporting bracket having a fork at one end comprising vertically spaced arms, an upright member positioned between said arms and pivotally connected thereto for swinging movement about a vertical axis, an elongated horizontal bar mounted in said upright member and adapted for rotary and axial adjustments therein, a horizontal shaft rotatably supported by said bar at one end thereof, a deburring wheel secured to said shaft in deburring relation to the gear to be deburred, means for driving said shaft, and spring means connected to the opposite end of said bar for constantly urging it in a direction to move the deburring wheel into abrading engagement with the adjacent side face of the gear to remove burrs caused by the cutting action of the hob.

6. A deburring attachment for
   a gear cutting machine including
      a supporting frame,
      an arbor
         rotatably mounted in said frame having a hob
         secured thereto, and
      means for supporting a gear blank
         in cutting relation to the hob,
   said deburring attachment comprising
      an abrading wheel,
      drive means for said wheel and
      means for supporting said wheel for rotational,
         side-to-side, forward-and-backward, and up-and-down movement above a work area,
      said supporting means including
         bracket means adapted to be adjustably secured to said supporting frame, and
         a rigid bar member being pivotally mounted at said bracket means, and
            at one end thereof being adapted to support said wheel, and
            at the other end having yieldable means, for gently urging the abrading wheel into engagement with the gear blanks,
      whereby said wheel is adapted to finish and smoothen a surface on said gear blank with a feather-like action.

References Cited in the file of this patent

UNITED STATES PATENTS

| | | |
|---|---|---|
| 1,928,770 | Uhlmann et al. | Oct. 3, 1933 |
| 2,184,232 | Christman | Dec. 19, 1939 |
| 2,430,375 | Upton | Nov. 4, 1947 |
| 2,722,028 | Lynch et al. | Nov. 1, 1955 |
| 2,787,195 | Topolinski | Apr. 2, 1957 |
| 2,871,764 | Seavey | Feb. 3, 1959 |
| 2,921,504 | Glingener | Jan. 19, 1960 |
| 2,988,964 | Van Acker | June 20, 1961 |

UNITED STATES PATENT OFFICE
CERTIFICATE OF CORRECTION

Patent No. 3,130,642             April 28, 1964

Eugene W. Kulesh et al.

It is hereby certified that error appears in the above numbered patent requiring correction and that the said Letters Patent should read as corrected below.

Column 2, line 12, for "grouping" read -- gouging --; column 4, line 72, for "spindle" read -- spindles --.

Signed and sealed this 8th day of September 1964.

(SEAL)
Attest:

ERNEST W. SWIDER
Attesting Officer

EDWARD J. BRENNER
Commissioner of Patents